(12) United States Patent
Wu

(10) Patent No.: US 8,300,024 B2
(45) Date of Patent: Oct. 30, 2012

(54) SYSTEMS FOR DISPLAYING IMAGES

(75) Inventor: Tse-Hung Wu, Yonghe (TW)

(73) Assignee: Chimei Innolux Corporation, Chu-Nan (TW)

( * ) Notice: Subject to any disclaimer, the term of this patent is extended or adjusted under 35 U.S.C. 154(b) by 648 days.

(21) Appl. No.: 12/459,798

(22) Filed: Jul. 7, 2009

(65) Prior Publication Data
US 2010/0013779 A1 Jan. 21, 2010

(30) Foreign Application Priority Data

Jul. 15, 2008 (TW) .............................. 97126773 A

(51) Int. Cl.
G06F 3/041 (2006.01)
(52) U.S. Cl. ....................................... 345/173; 345/156
(58) Field of Classification Search .................. 345/156, 345/173
See application file for complete search history.

(56) References Cited

U.S. PATENT DOCUMENTS

| 5,914,465 | A | | 6/1999 | Allen et al. | |
| 6,075,520 | A | * | 6/2000 | Inoue et al. | 345/173 |
| 6,239,788 | B1 | * | 5/2001 | Nohno et al. | 345/173 |
| 7,280,167 | B2 | * | 10/2007 | Choi et al. | 349/12 |
| 7,432,915 | B2 | * | 10/2008 | Yoshikawa | 345/173 |
| 2005/0094038 | A1 | * | 5/2005 | Choi et al. | 349/12 |
| 2007/0030255 | A1 | * | 2/2007 | Pak et al. | 345/173 |
| 2007/0257890 | A1 | * | 11/2007 | Hotelling et al. | 345/173 |
| 2009/0091552 | A1 | * | 4/2009 | Lee | 345/174 |
| 2009/0160822 | A1 | * | 6/2009 | Eguchi et al. | 345/174 |
| 2009/0231294 | A1 | * | 9/2009 | Wu | 345/173 |

* cited by examiner

Primary Examiner — Bipin Shalwala
Assistant Examiner — Afroza Chowdhury
(74) Attorney, Agent, or Firm — Liu & Liu

(57) ABSTRACT

A system for displaying images includes a touch sensing circuit. The touch sensing circuit comprises a voltage storage unit for detecting whether a touch event has occurred and generates a corresponding voltage. The voltage storage unit comprises first to third capacitors. The first capacitor has a first terminal coupled to a ground terminal and a second terminal coupled to a first node. The second capacitor has a first terminal coupled to the ground terminal and a second terminal coupled to a second node. When the voltage storage unit detects that a touch event has occurred, the second node is coupled to an AC voltage. The third capacitor is formed between the first and second nodes. When the touch event has occurred, a value of the third capacitor is changed, so that the corresponding voltage at the first node is changed.

20 Claims, 5 Drawing Sheets

SYSTEMS FOR DISPLAYING IMAGES

CROSS REFERENCE TO RELATED APPLICATIONS

This application claims the benefit of Taiwan application Serial No. 097126773 filed Jul. 15, 2008, the subject matter of which is incorporated herein by reference.

BACKGROUND OF THE INVENTION

1. Field of the Invention

The invention relates to a system for displaying images, and more particularly to a touch sensing circuit of a system for displaying images.

2. Description of the Related Art

Currently, due to integrated information application products, touch panels have gradually replaced conventional human-machine interfaces, such as keyboards and mice. Since users can operate touch panels easily and conveniently, touch panels have been applied in many fields; for example, portable communication products and information products, bank/commerce systems, medicine registering systems, factory monitor systems, public information guiding systems, etc. According to sensing methods, touch panels are divided into a capacitance type, a resistance type, a sound-wave type, an infrared-ray type, and a magnetism-sensing type. The capacitance type is usually applied in large-sized touch panels. Touch between a finger/touch stylus and a touch panel causes a capacitance change and further generates a corresponding voltage. According to the generated voltage, the position of the touch point is detected in X and Y directions, and signals or instructions corresponding to the touch point is sent.

BRIEF SUMMARY OF THE INVENTION

An exemplary embodiment of a system for displaying images comprises a touch sensing circuit. The touch sensing circuit comprises a voltage storage unit for detecting whether a touch event has occurred and generates a corresponding voltage. The voltage storage unit comprises first to third capacitors and first and second switch elements. The first capacitor has a first terminal coupled to a ground terminal and a second terminal coupled to a first node. The second capacitor has a first terminal coupled to the ground terminal and a second terminal coupled to a second node. When the voltage storage unit detects whether a touch event has occurred, the second node is coupled to an alternating current (AC) voltage. The third capacitor is formed between the first and second nodes. When the touch event has occurred, a value of the third capacitor is changed, so that the corresponding voltage at the first node is changed. The first switch element has a first terminal coupled to the first node and a second terminal coupled to the second node. The second switch element has a first terminal coupled to the first node and a second terminal.

An exemplary embodiment of a system for displaying images comprises a plurality of first lines, a plurality of second lines interlaced with the first lines, and a touch sensing circuit. The touch sensing circuit comprises a voltage storage unit for detecting whether a touch event has occurred and generates a corresponding voltage. The voltage storage unit comprises a plurality of sensing cells disposed in a sensing array. Each of the sensing cells correspond to the interlaced first line and second line and comprises a first capacitor and a first switch element. The first capacitor is formed between the corresponding first line and the corresponding second line. When the touch event has occurred in the corresponding sensing cell, a value of the first capacitor is changed. The first switch element has a first terminal coupled to the corresponding first line and a second terminal coupled to the corresponding second line.

The touch sensing circuit further comprises a plurality of second capacitors, a plurality of third capacitors, a plurality of second switch elements, and a plurality of switch units. The second capacitors are respectively coupled to the first lines, and each of the second capacitors has a first terminal coupled to a ground terminal and a second terminal coupled to the corresponding first line. The third capacitors are respectively coupled to the second lines, and each of the third capacitors has a first terminal coupled to the ground terminal and a second terminal coupled to the corresponding second line. The second switch elements are respectively coupled to the first lines, and each of the second switch elements has a first terminal coupled to the corresponding first line and a second terminal. The switch units are respectively coupled to the second lines. When the voltage storage unit detects whether a touch event has occurred, the switch units are turned on sequentially in a first pre-determined order for providing an alternating current (AC) voltage to the second lines.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
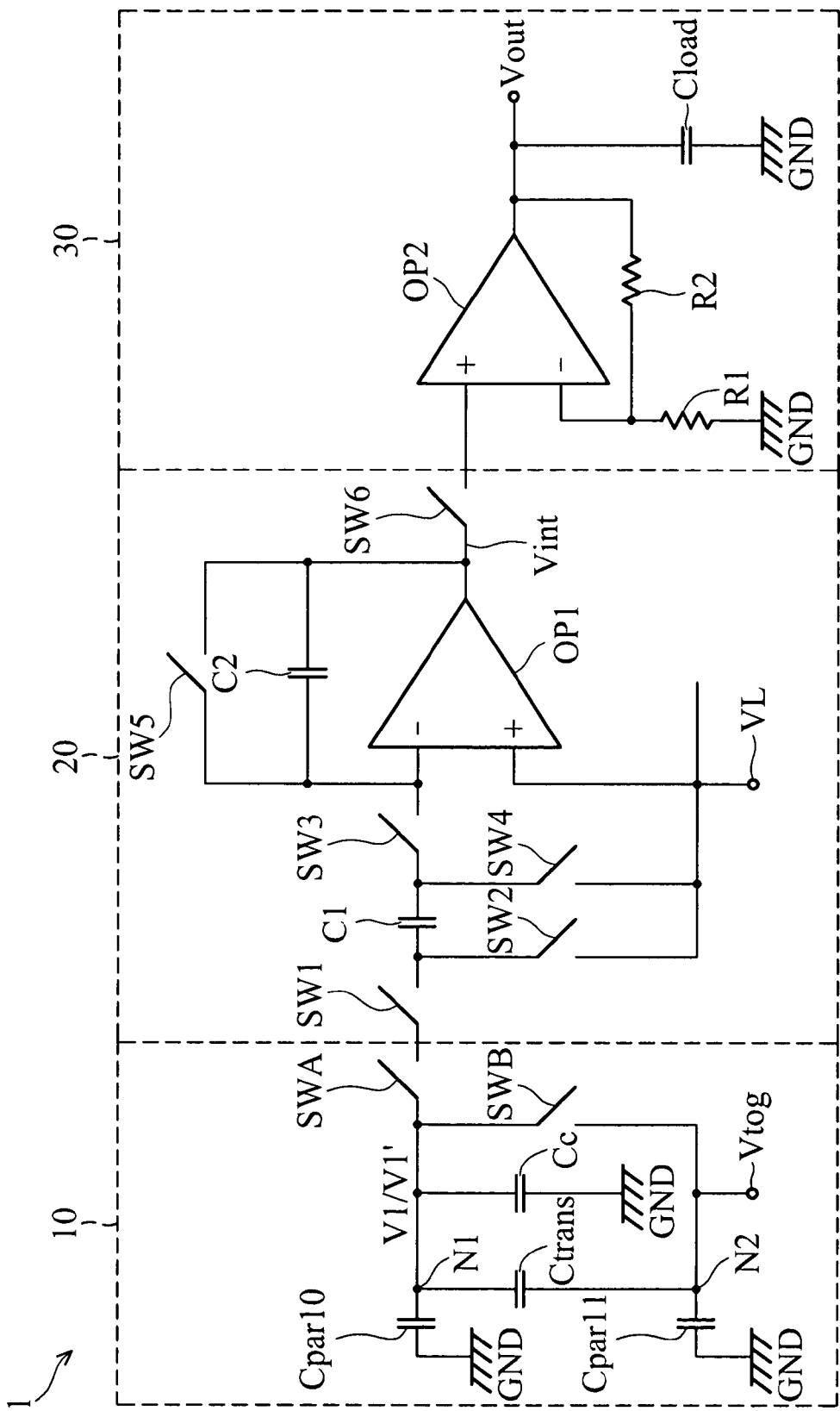
FIG. 1 shows an exemplary embodiment of a touch sensing circuit.

In an exemplary embodiment of a touch sensing circuit FIG. 1, a touch sensing circuit 1 is applied in a capacitance type touch panel. In the following description, a sensing cell is given as an example. Referring to FIG. 1, the touch sensing circuit 1 comprises a voltage storage unit 10, an integration unit 20, and a voltage amplifying unit 30. The voltage storage unit 10 detects whether a touch event has occurred and generates a corresponding voltage. When a touch event has occurred, there is a voltage variation in the voltage storage unit 10, and the corresponding voltage is changed according to the voltage variation. The integration unit 20 integrates the corresponding voltage generated by the voltage storage unit 10 and generates an integration signal Vint. The voltage amplifying unit 30 receives and amplifies the integration signal Vint and then generates an output voltage Vout for sequential processing, such as touch identification and signal processing.

Referring FIG. 1, the voltage storage unit 10 comprises capacitors Cpar10, Cpar11, and Cc and switch elements SWA and SWB. A first terminal of the capacitor Cpar10 is coupled to a ground terminal GND, and a second terminal thereof is coupled to a node N1. A first terminal of the capacitor Cpar11 is coupled to the ground terminal GND, and a second terminal thereof is coupled to a node N2. The capacitor Cpar10 is a parasitic capacitor of a signal line coupled to the node N1, while the capacitor Cpar11 is a parasitic capacitor of a signal line coupled to the node N2. The capacitor Ctrans is formed between the nodes N1 and N2. A sensing cell is composed of the switch element SWB and the capacitor Ctrans. A first terminal of the capacitor Cc is coupled to the node N1, and a second terminal thereof is coupled to the ground terminal GND. The capacitor Cc is a parasitic capacitor between windings of the touch panel and the ground terminal GND. A first terminal of the switch element SWA is coupled to the node N1, and a second terminal thereof is coupled to the integration unit 20. A first terminal of the switch element SWB is coupled to the node N1, and a second thereof is coupled to the node N2. When the voltage storage unit 10 of the touch sensing circuit 1 detects whether a touch event has occurred, an alternating current (AC) voltage Vtog is provided to the node N2. In other words, the node N2 is coupled to the AC voltage Vtog. In some embodiments, a relatively high voltage VH and a relatively low voltage VL of the AC voltage Vtog are 5V and 0V respectively, however, without limitation.

The integration unit 20 comprises switch elements SW1-SW6, capacitors C1-C2, and operational amplifier OP1. A first terminal of the switch element SW1 is coupled to the second terminal of the switch element SWA, and a second terminal thereof is coupled to the capacitor C1. A first terminal of the switch element SW2 is coupled to the second terminal of the switch element SW1, and a second terminal thereof is coupled to the relatively low voltage VL of the AC voltage Vtog. A first terminal of the capacitor C1 is coupled to the second terminal of the switch element SW1 and the first terminal of the switch element SW2, and a second terminal thereof is coupled to the switch elements SW3 and SW4. A first terminal of the switch element SW3 is coupled to the second terminal of the capacitor C1, and a second terminal thereof is coupled to the operational amplifier OP1. A first terminal of the switch element SW4 is coupled to the second terminal of the capacitor C1 and a second terminal thereof is coupled to the relatively low voltage VL of the AC voltage Vtog.

As shown in FIG. 1, an inverting input terminal (−) of the operational amplifier OP1 is coupled the second terminal of the switch element SW3, a non-inverting input terminal (+) thereof is coupled to the relatively low voltage VL of the AC voltage Vtog, and an output terminal thereof is coupled to the switch elements SW5 and SW6 and capacitor C2. Both the capacitor C2 and the switch element SW5 are coupled between the inverting input terminal (−) and the output terminal of the operational amplifier OP1. A first terminal of the switch element SW6 is coupled to the output terminal of the operational amplifier OP1, and a second terminal thereof is coupled to the voltage amplifying unit 30. In this embodiment, the switch elements SWA, SWB, and SW1-SW6 can be implemented by metal-oxide-semiconductor (MOS) transistors or bipolar junction transistors (BJTs), however, without limitation.

The voltage amplifying unit 30 comprises an operational amplifier OP2, resistors R1 and R2, and a capacitor Cload. A non-inverting input terminal (+) of the operational amplifier OP2 is coupled to the switch element SW6, an inverting input terminal (−) thereof is coupled to the resistor R1, and an output terminal thereof is coupled to the capacitor Cload. A first terminal of the resistor R1 is coupled to the inverting input terminal (−) of the operational amplifier OP2, and a second terminal thereof is coupled to the ground terminal GND. The resistor R2 is coupled between the inverting input terminal (−) and the output terminal of the operational amplifier OP2. A first terminal of the capacitor Cload is coupled to the output terminal of the operational amplifier OP2, and a second terminal thereof is coupled to the ground terminal GND. In the embodiment of FIG. 1, the voltage amplifying unit 30 is an example. In some embodiments, the voltage amplifying unit 30 can have different circuitries according to designs and requirements.

Figure 2:
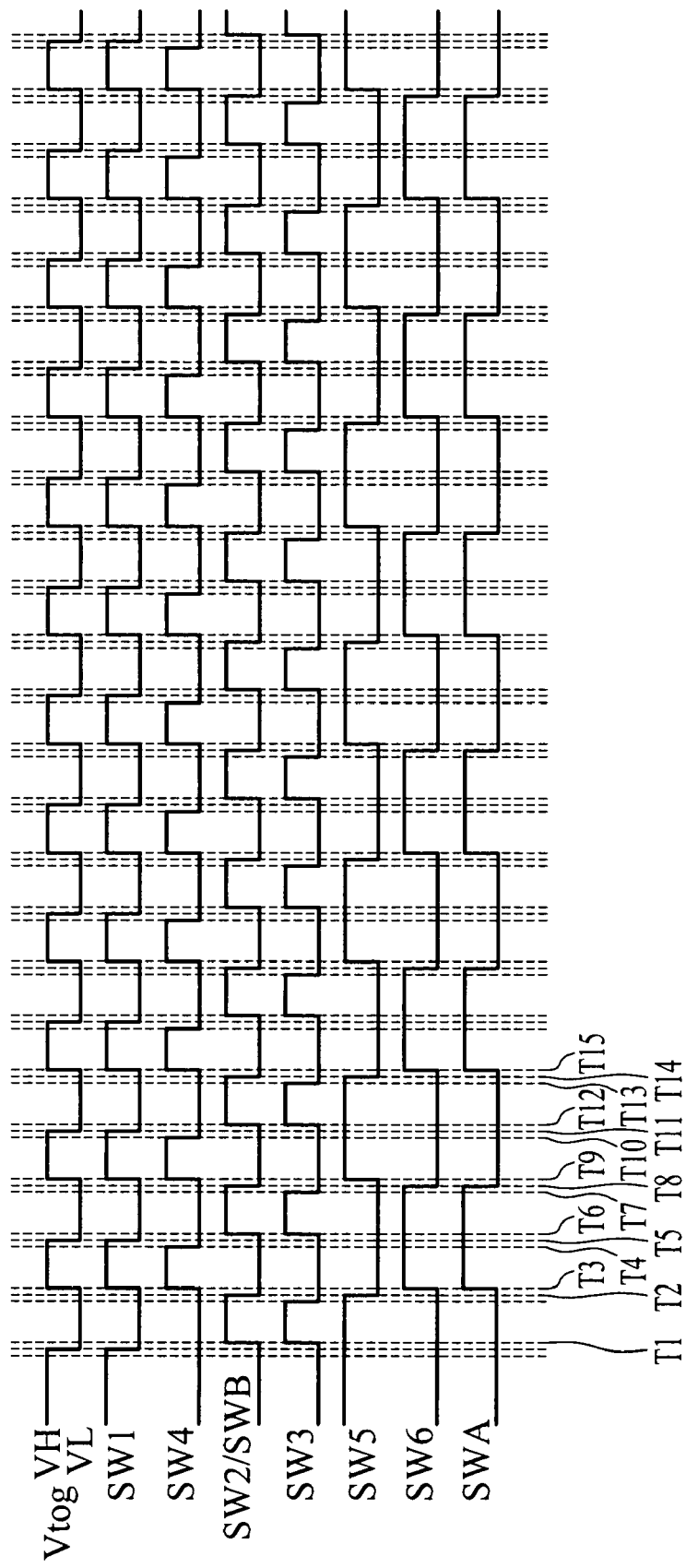
FIG. 2 shows signal timing when the voltage storage unit of the touch sensing circuit in FIG. 1 detects whether a touch event has occurred.

FIG. 2 shows signal timing when the voltage storage unit 10 of the touch sensing circuit 1 detects whether a touch event has occurred. The operation of the touch sensing circuit 1 will be described according to FIGS. 1 and 2 in the following.

In a period between time points T1 and T2, the switch element SWB is turned on, and the AC voltage Vtog is at the relatively low voltage VL. Thus, a voltage V1 at the node N1 is equal to the relatively low voltage VL (V1=VL).

At the time point T2, the switch element SWB is turned off.

At a time point T3, the AC voltage is changed from the relatively low voltage VL to the relatively high voltage VH. At this time, the voltage V1 is also changed, and the variation ΔV of the voltage V1 is represented by:

$$\Delta V = (VH - VL)\left(\frac{Ctrans}{Ctrans + Cpar10}\right).$$

Thus, the voltage at the node N1 is changed to a voltage V1′:

$$V1' = V1 + \Delta V = VL + (VH - VL)\left(\frac{Ctrans}{Ctrans + Cpar10}\right).$$

When no touch event has occurred, that is when a user's figure or a touch stylus does not touch the touch panel, the capacitor Ctrans remains at a fixed value. When a touch event has occurred, that is when a user's figure or a touch stylus touches the touch panel, the value of the capacitor Ctrans is changed. The voltage V1′ is changed with the change of the capacitor Ctrans. At the same time, the switch element SWA is turned on. Thus, the voltage V1′ at the node N1 of the voltage storage unit 10 is output to the integration unit 20. Further, since the switch elements SW1 and SW4 are turned on, the voltage V1′ is stored in the capacitor C1.

At a time point T4, the switch element SW4 is turned off. At a time point T5, the switch element SW1 is also turned off, and the AC voltage Vtog is changed from the relatively high voltage VH to the relatively low voltage VL.

At a time point T6, the switch elements SW2 and SW3 are turned on, so that the voltage V1′ stored in the capacitor C1 is integrated by an integrator composed of the operational amplifier OP1 and the capacitors C1 and C2. The integrated voltage serves as the integration signal Vint which is provided to the non-inverting input terminal of the operational amplifier OP2 of the voltage amplifying unit 30. For example, the integrated voltage (that is the integration signal Vint) can be represented by $$V1' \times \frac{C1}{C2}.$$

The integration signal Vint is amplified by an amplifier composed of the operational amplifier OP2 and the resistors R1 and R2 to serve as the output signal Vout. At this time, the switch element SWB is turned on again. Since the AC voltage Vtog is changed from the relatively high voltage VH to the relatively low voltage VL, the voltage at the node N1 is charged to the relatively low voltage VL.

At a time point T7, the switch element SW3 is turned off. At a time point T8, the switch elements SWA, SWB, SW2, and SW6 are turned off.

At a time point T9, the AC voltage Vtog is changed from the relatively low voltage VL to the relatively high voltage VH. At this time, the voltage at the node N1 is changed again according to whether a touch event has occurred. The detailed voltage changes at the node N1 is the same as the above description, thus it is omitted herein. The switch element SW5 is turned on. The capacitor C2 is discharged through a virtual short path between the inverting input terminal (−) and the non-inverting input terminal (+) of the operational amplifier OP2. Moreover, the switch element SW4 is also turned on, so that the second terminal of the capacitor C1 is coupled to the relatively low voltage VL.

At a time point T10, the switch element SW4 is turned off. At a time point T11, the switch element SW11 is turned off, and the AC voltage Vtog is changed from the relatively high voltage VH to the relatively low voltage VL.

At a time point T12, the switch elements SW2 and SW3 are turned on, so that the capacitors C1 and C2 are discharged. Moreover, the switch element SWB is turned on, and the AC voltage Vtog is at the relatively low voltage VL. Thus, the node N1 is charged to the relatively low voltage VL.

AT a time point T13, the switch element SW3 is turned off. At a time point T14, the switch elements SW2 and SW5 are turned off, so that the discharge of the capacitors C1 and C2 is finished. Moreover, the switch element SWB is turned off.

At a time point T15, the AC voltage Vtog is changed from the relatively low voltage VL to the relatively high voltage VH. The voltage at the node N1 is changed again according to whether a touch event has occurred. The detailed voltage changes at the node N1 is the same as the above description, thus it is omitted herein. At this time, the switch element SWA is turned on. Thus, the voltage at the node N1 is output to the integration unit 20. Moreover, since the switch elements SW1 and SW4 are turned on, the voltage at the node N1 is stored in the capacitor C1.

The integration unit 20 of FIG. 1 is an example. In other embodiments, the integration unit 20 can have different circuitries according to designs and requirements. Thus, timing of control signals of the switch elements SW1-SW6 is different with the different circuitries of the integration unit 20.

In this embodiment, in the period (T3-T8) during which the switch element SW6 is turned on, the integration unit 20 performs the integration operation once. However, in some embodiments, in the period (T3-T8) during which the switch element SW6 is turned on, the integration unit 20 can perform the integration operation many times.

Figure 3:
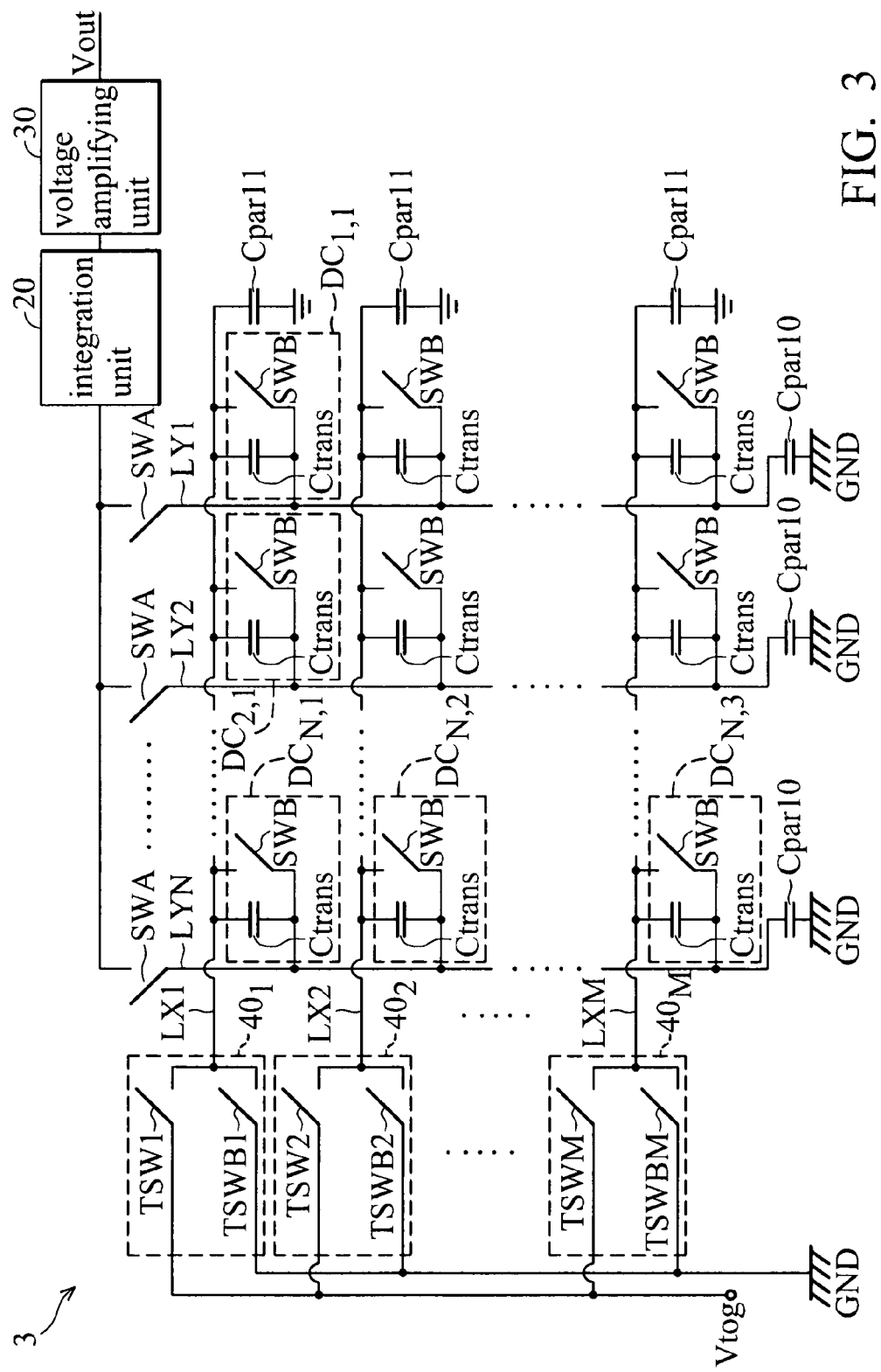
FIG. 3 shows an exemplary embodiment of a touch panel.

FIG. 3 shows an exemplary embodiment of a touch panel. A touch panel 3 comprises a plurality of vertical lines LY1-LYN, a plurality of horizontal lines LX1-LXM, a plurality of capacitors Ctrans, Cpar10, and Cpar11, a plurality of switch elements SWA and SWB, a plurality of switch units $40_1$-$40_M$, an integration unit 20, and a voltage amplifying unit 30. The vertical lines LY1-LYN are interlaced with the horizontal lines LX1-LXM. The capacitors Cpar10 are respectively coupled to the vertical lines LY1-LYN. The capacitors Cpar11 are respectively coupled to the horizontal lines LX1-LXM. The switch elements SWA are coupled between the vertical lines LY1-LYN and the integration unit 20, respectively.

Referring FIG. 3, one set of the switch unit SWB and the capacitor Ctrans compose one sensing cell, and each sensing cell corresponds to the interlaced vertical line and horizontal line. The sensing cells are disposed in a sensing array. For example, a sensing cell $DC_{N,1}$ comprises a switch element SWB and a capacitor Ctrans and corresponds to the interlaced vertical line LYN and horizontal line LX1. As shown in FIG. 3, the sensing cells coupled to the same vertical line share one capacitor Cpar10 and one switch element SWA, while the sensing cells couple to the same horizontal line share one capacitor Cpar11. For example, the sensing cells $DC_{N,1}$, $DC_{N,2}$, … $DC_{N,M}$ coupled to the vertical line LYN share one capacitor Cpar10 and one switch element SWA, while the sensing cells $DC_{1,1}$, $DC_{2,1}$, … $DC_{N,1}$ coupled to the horizontal line LX1 share one capacitor Cpar11. Further referring to FIGS. 1 and 3, the capacitors Ctrans, Cpar10, and Cpar11, switch elements SWB and SWA, the integration unit 20, and the voltage amplifying unit 30 compose a touch sensing circuit. The touch sensing circuit is applied in a sensing array for detecting whether a touch event has occurred in the sensing array.

The switch units $40_1$-$40_M$ are coupled to the horizontal lines LX1-LXn. Each switch unit comprises two switch elements respectively controlled by control signals inverse to each other. For example, the switch unit $40_1$ comprises switch elements TSW1 and TSWB1. The switch element TSW1 is coupled between the AC voltage Vtog and the horizontal line LX1, and the switch element TSWB1 is coupled between the ground terminal GND and the horizontal line LX1. For the sensing cells coupled to the same horizontal line, such as the sensing cells coupled to the same horizontal line LX1, when it is desired to detect whether a touch event has occurred in the sensing cells, the switch element TSW1 is turned on, and the switch element TSWB1 is turned off for providing the AC voltage Vtog to the horizontal line LX1. When it is not desired to detect whether a touch event has occurred in the sensing cells, the switch element TSW1 is turned off, and the switch element TSWB1 is turned on for providing voltage of the ground terminal GND to the horizontal line LX1.

Figure 4:
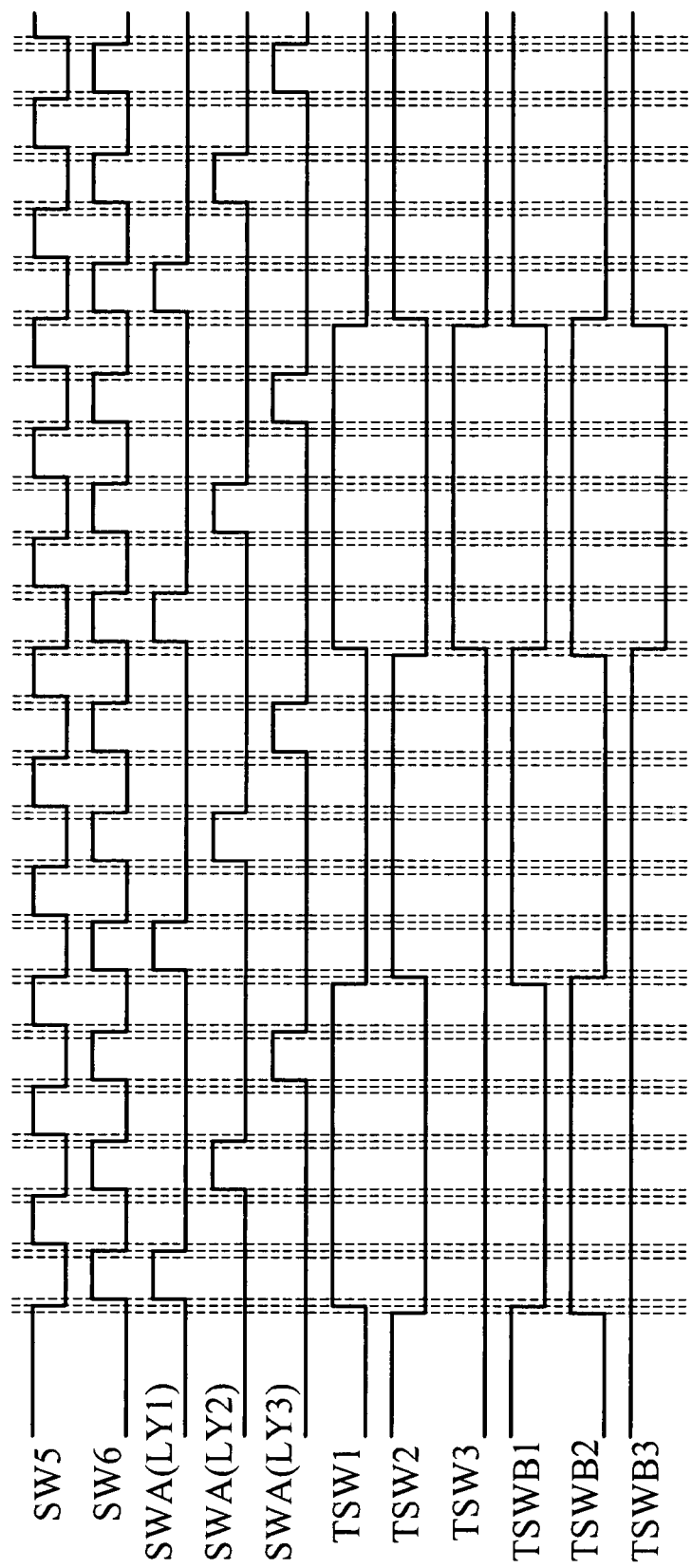
FIG. 4 shows signal timing when the touch panel in FIG. 3 detects whether a touch event has occurred.

In the following, the turned-on timings of the switch elements SWA and switch units $40_1$-$40_M$ are described according to FIGS. 3 and 4. It is assumed that N is equal to 3, and M is equal to 3. In other words, sensing cells compose of a 3×3 sensing array. Referring to FIG. 4, the switch elements TSW1-TSW3 are turned on sequentially. That each of the switch elements TSW1-TSW3 is turned on means that it has been detected that whether a touch event has occurred in the sensing cells coupled to the corresponding horizontal line. In the period during which each of the switch elements TSW1-TSW3 is turned on, the switch elements SWA respectively coupled to the vertical lines LY1-LY3 are turned on sequentially. Moreover, when one among the switch elements TSW1-TSW3 is turned on, the others are turned off.

For example, when the switch element TSW1 is turned on and the switch element TSWB1 is turned off, it is detected whether a touch event has occurred in the three sensing cells coupled to the horizontal line LX1, and the AC voltage Vtog is provided to the horizontal line LX1. In the period during which the switch element TSW1 is turned on, the switch elements coupled to the vertical lines LY1-LY3 are turned on sequentially for transmitting corresponding voltages generated by each sensing cell to the integration unit 20. At this time, the other switch elements, TSW2-TSW3 are turned off, and the switch elements, TSWB2-TSWB3 are turned on.

In this embodiment, the switch elements TSW1-TSW3 are turned on sequentially, and the switch elements SWA coupled to the vertical lines LY1-LY3 are also turned on sequentially. In applications, turned-on orders of the switch elements TSW1-TSW3 and the switch elements SWA are determined according to requirements.

Figure 5:
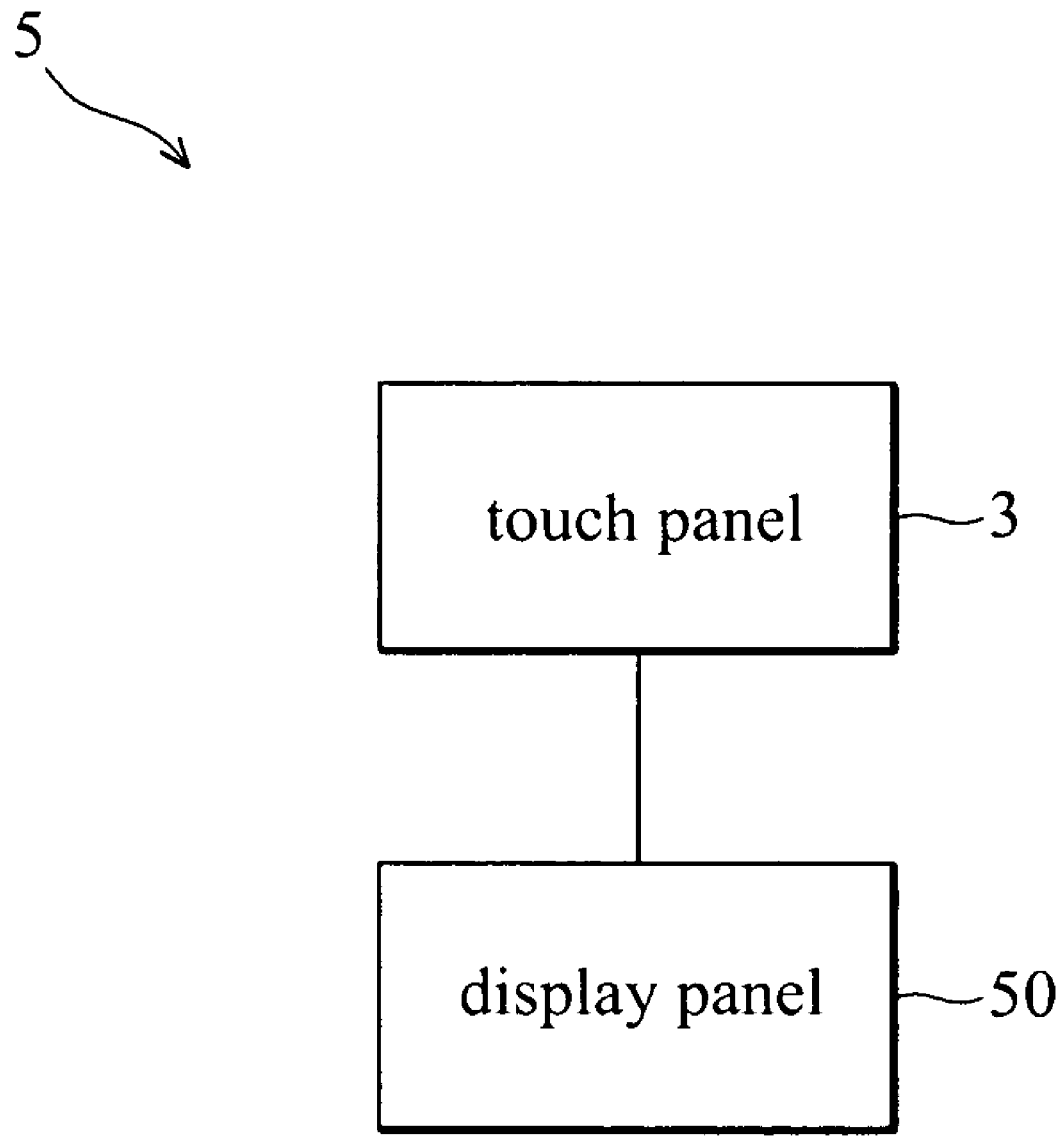
FIG. 5 shows an exemplary embodiment of a system for display images.

FIG. 5 shows an exemplary embodiment of a system for displaying images. The system for displaying images is implemented by an electronic device 5. As shown in FIG. 5, the electronic device 5 comprises the touch panel 3 of FIG. 3 for communicating with users and a display panel 50 for displaying images. The touch panel 3 comprises the integration unit 20 and the voltage amplifying unit 30 of FIG. 1. For example, the electronic device 5 can be a personal digital assistant (PDA), a player, a notebook computer, a digital camera, a display monitor, an automotive displayer, a tablet computer, a television, a global positioning system (GPS), an aviation displayer, a digital photo frame, a portable DVD displayer, or a cellular phone. The display panel 50 can be a liquid display panel, a plasma display panel, an organic light-emitting diode (OLED) display panel, or a thin film transistor (TFT) driving display panel, however, without limitation in other embodiments. In some embodiments, the touch panel 3 is integrated in the display panel 50.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
a touch sensing circuit comprising a voltage storage unit for detecting whether a touch event has occurred and generating a corresponding voltage, wherein the voltage storage unit comprises:
a first capacitor having a first terminal coupled to a ground terminal and a second terminal coupled to a first node;
a second capacitor having a first terminal coupled to the ground terminal and a second terminal coupled to a second node, wherein when the voltage storage unit detects whether a touch event has occurred, and the second node is coupled to an alternating current (AC) voltage;
a third capacitor formed between the first and second nodes, wherein when the touch event has occurred, a value of the third capacitor is changed, so that the corresponding voltage at the first node is changed;
a first switch element having a first terminal coupled to the first node and a second terminal coupled to the second node; and
a second switch element having a first terminal coupled to the first node and a second terminal.

2. The system as claimed in claim 1, wherein the voltage storage unit further comprises a fourth capacitor coupled between the first node and the ground terminal.

3. The system as claimed in claim 1, wherein when the voltage storage unit detects whether a touch event has occurred, in a first period, the first switch element is turned on, and the AC voltage is changed from first voltage to a second voltage that is lower than the first voltage, so that the corresponding voltage is charged to the second voltage.

4. The system as claimed in claim 3,
wherein when the voltage storage unit detects whether a touch event has occurred, in a second period, the first switch element is turned off, and the AC voltage is changed from the second voltage to the first voltage;
wherein when the touch even does not occur, the corresponding voltage is at a first level; and
wherein when the touch event has occurred, the value of the third capacitor is changed, and the corresponding voltage is changed to a second level when the value of the third capacitor is changed.

5. The system as claimed in claim 1, wherein the touch sensing circuit further comprises an integration unit, coupled to the second terminal of the second switch element, for integrating the corresponding voltage and generating an integration signal.

6. The system as claimed in claim 5, wherein the integration unit comprises:
a third switch element having a first terminal coupled to the second terminal of the second switch element and a second terminal;
a fifth capacitor having a first terminal coupled to the second terminal of the third switch element and a second terminal;
a fourth switch element having a first terminal coupled to the second terminal of the third switch element and a second terminal coupled to a second voltage of the AC voltage;
a fifth switch element having a first terminal coupled to the second terminal of the fifth capacitor and a second terminal;
a sixth switch element having a first terminal coupled to the second terminal of the fifth capacitor and a second terminal coupled to the second voltage;
an operational amplifier having an inverting input terminal coupled to the second terminal of the fifth switch element, a non-inverting input terminal coupled to the second voltage, and an output terminal;
a sixth capacitor coupled between the inverting input terminal and the output terminal of the operational amplifier;
a seventh switch element between the inverting input terminal and the output terminal of the operational amplifier; and
an eighth switch element, coupled to the output terminal of the operational amplifier, for providing the integration signal.

7. The system as claimed in claim 6, wherein the touch sensing circuit further comprises a voltage amplifying unit, coupled to the eighth switch element, for receiving and amplifying the integration signal when the eighth switch element is turned on to generate an output signal.

8. The system as claimed in claim 1 further comprising a touch panel, wherein the touch panel comprises the touch sensing circuit.

9. The system as claimed in claim 8 further comprises an electronic device, wherein the electronic device comprises a display panel for displaying images, and the system communicates with a user trough the touch panel.

10. The system as claimed in claim 9, wherein the electronic device is a personal digital assistant (PDA), a player, a notebook computer, a digital camera, a display monitor, an automotive displayer, a tablet computer, a television, a global positioning system (GPS), an aviation displayer, a digital photo frame, a portable DVD displayer, or a cellular phone.

11. A system for displaying images, comprising:
a plurality of first lines;
a plurality of second lines interlaced with the first lines; and
a touch sensing circuit comprising a voltage storage unit for detecting whether a touch event has occurred and generating a corresponding voltage, wherein the voltage storage unit comprises:
   a plurality of sensing cells disposed in a sensing array, wherein each of the sensing cells correspond to the interlaced first line and second line and comprises:
      a first capacitor formed between the corresponding first line and the corresponding second line, wherein when the touch event has occurred in the corresponding sensing cell, a value of the first capacitor is changed; and
      a first switch element having a first terminal coupled to the corresponding first line and a second terminal coupled to the corresponding second line;
   a plurality of second capacitors respectively coupled to the first lines, each having a first terminal coupled to a ground terminal and a second terminal coupled to the corresponding first line;
   a plurality of third capacitors respectively coupled to the second lines, each having a first terminal coupled to the ground terminal and a second terminal coupled to the corresponding second line;
   a plurality of second switch elements respectively coupled to the first lines, each having a first terminal coupled to the corresponding first line and a second terminal; and
   a plurality of switch units respectively coupled to the second lines, wherein when the voltage storage unit detects whether a touch event has occurred, the switch units are turned on sequentially in a first pre-determined order for providing an alternating current (AC) voltage to the second lines.

12. The system as claimed in claim 11, wherein each of the switch units comprises:
   a third switch element having a first terminal coupled to the AC voltage and a second terminal coupled to the corresponding second line; and
   a fourth switch element having a first terminal coupled to the ground terminal and a second terminal coupled to the corresponding second line,
   wherein for the sensing cells coupled to the corresponding second line, when the voltage storage unit detects whether a touch event has occurred, the third switch element is turned on, and the fourth switch element is turned off for providing the AC voltage to the corresponding second line; and
   wherein for the sensing cells coupled to the corresponding second line, when the voltage storage unit does not detect whether a touch event has occurred, the third switch element is turned off, and the fourth switch element is turned on for providing a voltage of the ground terminal to the corresponding second line.

13. The system as claimed in claim 11, wherein for each of the switch units, when the switch unit is turned on, the second switch elements are turned on sequentially in a second pre-determined order.

14. The system as claimed in claim 11, wherein each of the sensing cells further comprises a fourth capacitor coupled between the corresponding first line and the ground terminal.

15. The system as claimed in claim 11, wherein the touch sensing circuit further comprises an integration unit, coupled to the second terminal of the second switch element, for integrating voltages of the first lines and generating a plurality of integration signals.

16. The system as claimed in claim 15, wherein for the sensing cells coupled to the same second lines, when the voltage storage unit detects whether a touch event has occurred, the second switch elements are turned on sequentially in a second pre-determined order for providing the voltages of the first lines to the integration unit.

17. The system as claimed in claim 15, wherein the voltage storage unit further comprises a voltage amplifying unit, coupled to the integration unit, for receiving and amplifying the integration signals and generating output signals which indicate that whether a touch event has occurred in the sensing cells.

18. The system as claimed in claim 11 further comprising a touch panel, wherein the touch panel comprises the touch sensing circuit.

19. The system as claimed in claim 18 further comprises an electronic device, wherein the electronic device comprises a display panel for displaying images, and the system communicates with a user through the touch panel.

20. The system as claimed in claim 19, wherein the electronic device is a personal digital assistant (PDA), a player, a notebook computer, a digital camera, a display monitor, an automotive displayer, a tablet computer, a television, a global positioning system (GPS), an aviation displayer, a digital photo frame, a portable DVD displayer, or a cellular phone.

* * * * *